United States Patent
Bosley et al.

[15] 3,646,592
[45] Feb. 29, 1972

[54] CUBE PATTERN GAME

[72] Inventors: Denis V. Bosley, Palos Verdes Peninsula; Lucia C. Pearce, Altadena, both of Calif.

[73] Assignee: Mattel, Inc., Hawthorne, Calif.

[22] Filed: Oct. 23, 1969

[21] Appl. No.: 868,705

[52] U.S. Cl. ................................. 35/9 D, 35/72, 35/73, 46/26, 273/157 R
[51] Int. Cl. ........................................... G09b 7/00
[58] Field of Search .................. 35/8, 6, 9, 31 C, 26, 35 D, 35/30, 48 R, 34, 69–72, 73; 273/157; 46/1, 24, 25, 26

[56] References Cited

UNITED STATES PATENTS

| | | | |
|---|---|---|---|
| 2,319,162 | 5/1943 | Short | 35/26 |
| 2,335,941 | 12/1943 | Howard | 35/26 |
| 3,067,524 | 12/1962 | Parker | 35/9 R |
| 3,289,322 | 12/1966 | Patrick | 35/34 X |
| 3,222,072 | 12/1965 | Dreyer | 273/157 R |
| 3,510,134 | 5/1970 | Brooks et al | 46/24 |

*Primary Examiner*—Wm. H. Grieb
*Attorney*—Seymour A. Scholnick

[57] ABSTRACT

A game for testing spatial relations comprising a transparent cube composed of two three-sided members which can be fitted together in either of three rotational positions to form a cube. Each member has three-dimensional objects mounted on its inside so that different patterns are seen when the cube is viewed from each of its six different sides, there being a total of 18 different patterns formed for the three rotational positions of the members. A testing machine is provided which receives the cube, and any one of a plurality of cards, each card displaying one possible two-dimensional cube pattern which can be seen at one orientation of the cube on the machine. The cube has indicia along its edges and the cards have corresponding indicia, and the testing machine compares the indicia. The machine either turns on a light or sounds a buzzer, to indicate whether the arrangements seen on the cube and card match or do not match, respectively.

8 Claims, 7 Drawing Figures

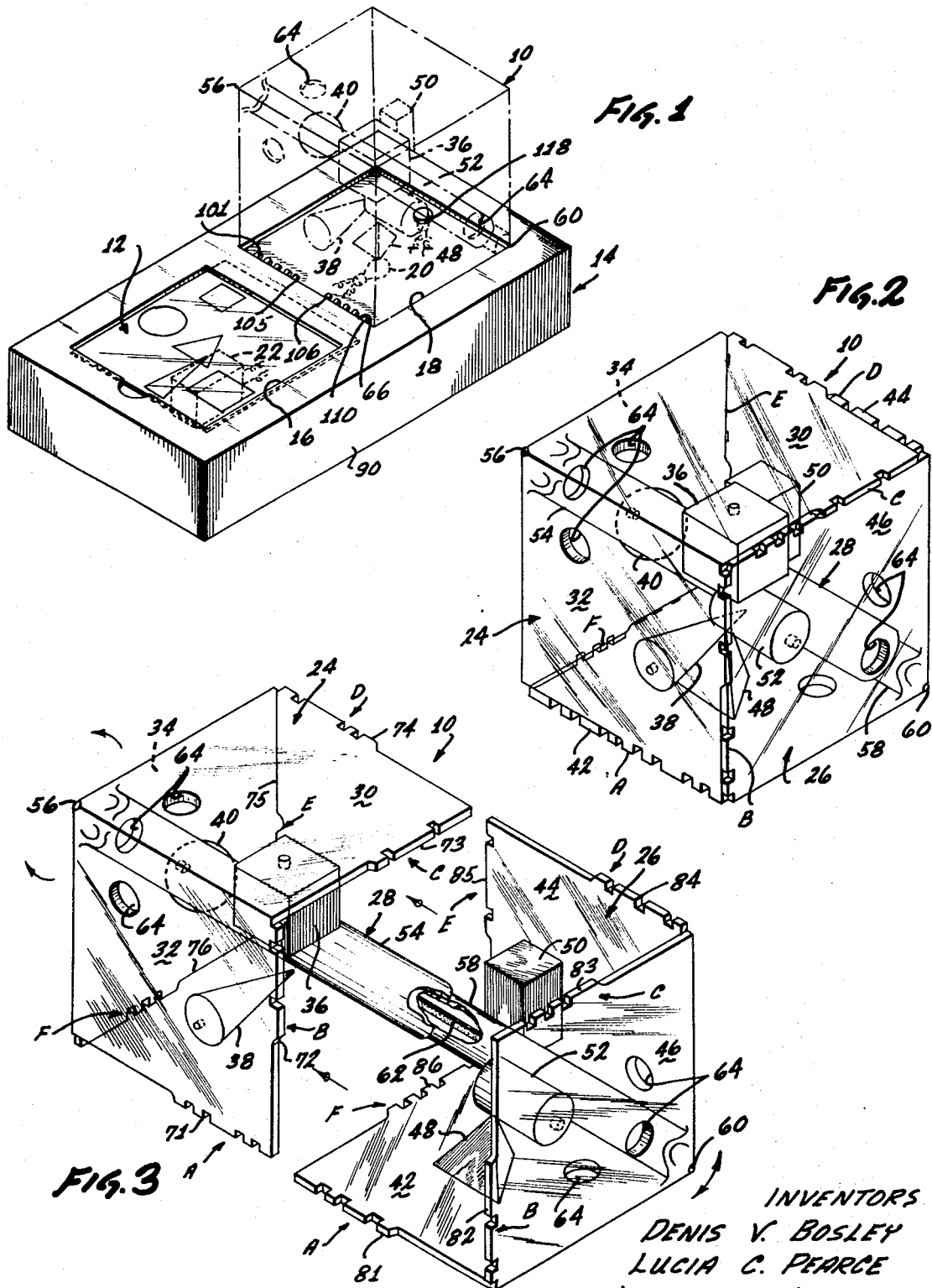

PATENTED FEB 29 1972        3,646,592
FIG. 4
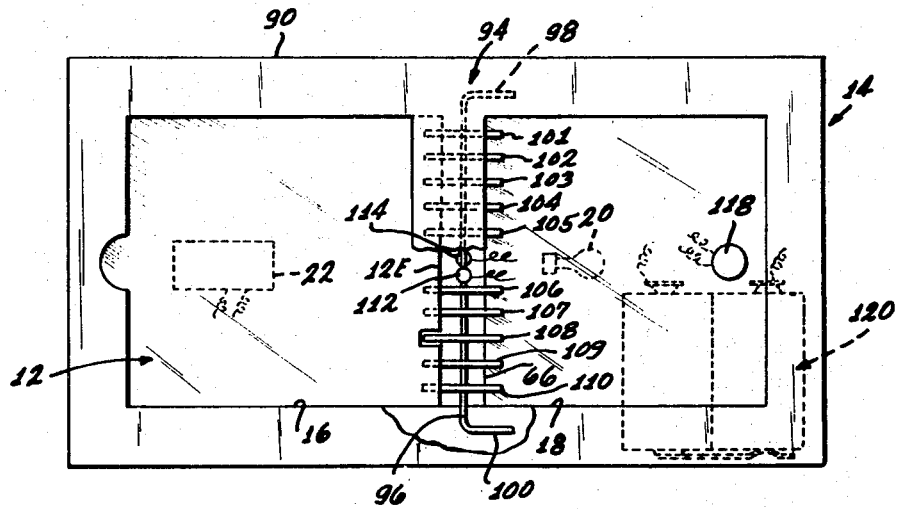
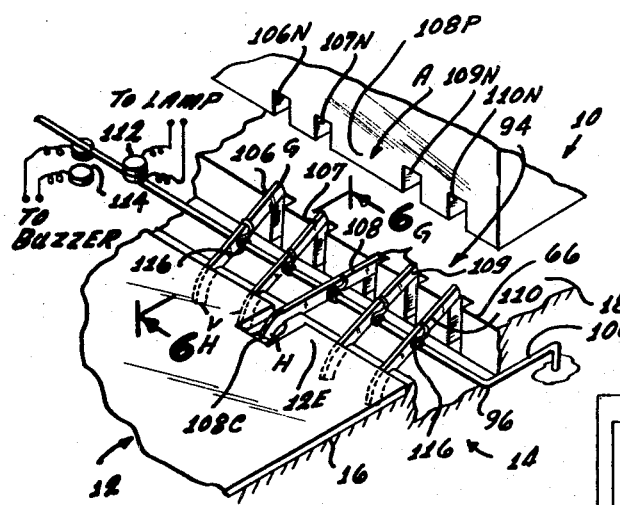
FIG. 5
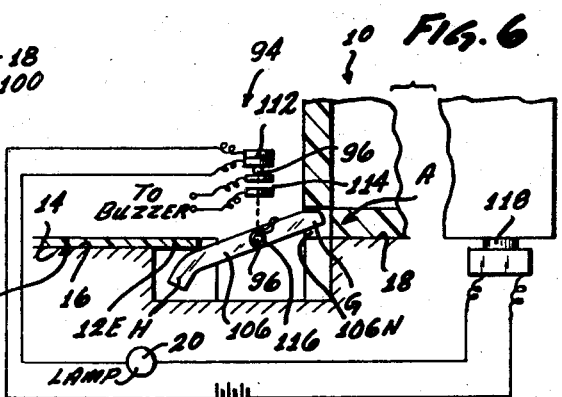
FIG. 6
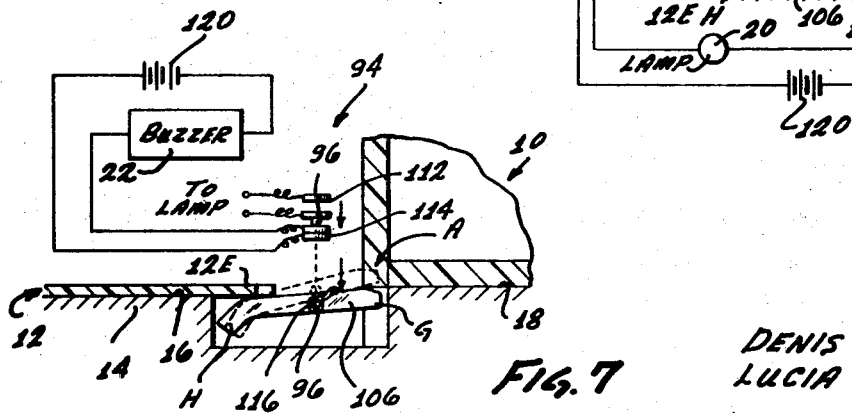
FIG. 7
INVENTORS
DENIS V. BOSLEY
LUCIA C. PEARCE
By Max E. Shirk
ATTORNEY

CUBE PATTERN GAME

BACKGROUND OF THE INVENTION

1. Field of the Invention

This invention relates to game and testing apparatus.

2. Description of the Prior Art

Spatial ability can be tested by asking a child to match patterns printed on a sheet of paper. However, the use of only pencil and paper can make such testing uninteresting and the child may become bored. Spatial testing that involved novel apparatus which is operated in a novel manner could greatly increase a child's interest, and serve not only to test him, but as an educational toy to teach him spatial relationships.

OBJECTS AND SUMMARY OF THE INVENTION

An object of the present invention is to provide novel and entertaining apparatus for testing spatial ability.

Another object is to provide a geometric object which can be made to display a wide variety of patterns.

In accordance with the present invention, a novel and entertaining game apparatus is provided for testing or developing spatial ability. In one embodiment of the invention, a transparent cube is provided which is composed of two three-sided members that can be fitted together in three different rotational positions. Each member has three-dimensional objects mounted on its inside so that different patterns or arrangements appear when the cube is viewed from any of its six sides, and the arrangements can be changed by rotating the members to a new relative position.

A testing machine is provided which has one region for receiving one face of the cube and another region for receiving any one of a set of cards. Each card carries a picture displaying a pattern at a particular orientation, which may be observed on the cube at a particular orientation of the cube. Some of the edges of the cube are coded by notches formed therein, and each card has a set of notches that correspond to the notches that may exist along one edge of the cube. The testing machine has members that compare the notches on the card with the notches along one edge of the cube to determine if they correspond. The machine has a light which is turned on if the card and cube edge correspond, and a buzzer which sounds if the card and cube edge do not correspond.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of game apparatus constructed in accordance with the invention;

FIG. 2 is a perspective view of the cube of the game apparatus of FIG. 1;

FIG. 3 is a perspective view of the cube of FIG. 2 shown with the members thereof moved apart for rotation to different relative positions;

FIG. 4 is a plan view, partly in section, of the testing machine of FIG. 1;

FIG. 5 is a partial perspective view of the testing machine of FIG. 4;

FIG. 6 is a sectional view taken on the line 6—6 of FIG. 5, showing the machine in a state when a cube and card in the machine correspond; and FIG. 7 is a view similar to that of FIG. 6, but showing the machine when a cube and card therein do not correspond.

DESCRIPTION OF THE PREFERRED EMBODIMENTS

FIG. 1 illustrates game apparatus including a cube 10 for displaying patterns, a card 12 that carries a pattern which can be displayed by the cube, and a testing machine 14 for receiving the cube and card to indicate whether the patterns displayed by them are identical or different. A child first places one of 18 different cards in a card-receiving region 16 of the testing machine. The child then attempts to manipulate the cube 10 so that the pattern which will be observed when looking down on it is congruent with the pattern on the card and is oriented in the same way. The child then places the cube in a shallow cube-receiving recess region 18 on the testing machine. If the card and cube correctly match, a lamp 20 under the cube-receiving region will light up, while if the card and cube do not match a buzzer 22 will sound.

As shown in detail in FIG. 3, the cube comprises first and second cube members 24, 26, each having three mutually perpendicular sides or faces of a transparent material, such as a transparent plastic. Holding apparatus 28 extending between the far corners of the two members biases the members toward each other and holds them together to form a cube, as shown in FIG. 2. However, the members can be moved apart and rotated to each of three relative rotational positions.

Each side of the cube carries a three-dimensional object that forms part of the pattern that can be seen by looking through the cube. Thus, sides 30, 32, and 34 of the first cube member support a cube block 36, a cone 38, and a sphere 40, while the three sides 42, 44, and 46 of the second cube member support a tetrahedron 48, a rectangular prism 50, and a cylinder 52. While the six sides of the cube are transparent, the six geometric objects mounted on their inner surfaces are opaque and are of different colors. The use of three-dimensional objects allows each object to form part of the pattern seen through cube sides which are perpendicular to the side on which it is mounted. In the particular device illustrated, the geometric objects are positioned so that at least part of every object can be seen when viewing the cube through any of its six sides.

The holding apparatus 28 comprises an outer tube 54 having one end fixed to the corner 56 of the first cube member, an inner tube 58 having one end fixed to the corner 60 of the second cube member, and an elastic cord 62 which has opposite ends fixed to the corners 56 and 60 of the cube members. The cube members 24, 26 can be pulled apart to the position shown in FIG. 3, rotated 120°, and then moved together to again form a cube. However, the six geometrical objects on the newly formed cube will have a different relationship to each other, so that different patterns will be seen when a person looks through any side of the cube. In order to facilitate grasping of the two members 24, 26 to pull them apart, each member has three holes 64, formed near its corners, for receiving a child's fingers to facilitate grasping of the member.

The cube 10 can be placed on the testing machine 14 so that any one of six faces is uppermost. In addition, with a given face uppermost, the cube can be turned (about a vertical axis) to any one of four orientations, and still be received in the cube-receiving region 18 of the machine. Thus, there are 24 different ways in which a cube can be installed on the testing machine. If we further consider the fact that the cube members 24, 26 can be fitted together in three different relative positions, there are 72 ways in which the cube may be installed on the testing machine, each of these 72 ways presenting a different pattern or orientation of the pattern.

The testing machine is able to detect whether the cube is oriented in the proper one of the 72 different configurations possible by sensing a set of notches formed in the edge of the cube which lies adjacent to a boundary line 66 of the cube-receiving recess 18. The cube 10 has 12 edges, six of them labeled A through F having several notches that identify the edge. When the cube is placed on the testing machine, the set of notches that extends along line 66 of the machine identifies which of the 12 edges of the cube lies therealong, and in which of the three configurations (which of the three relative rotational positions of members 24 and 26) the cube has been placed.

As shown in FIG. 3, the first cube member 24 has six edges 71–76 with notches therealong, the notches extending only along one-half of the length of the edge, the other half of the edge length being recessed. The second cube member 26 is similarly constructed, having six edges 81–86 with notches along about one-half of the edge length and a recess along the rest of each edge. The edges of the cube members are constructed so that when the cube members fit together, the notched portions of each edge of the first member are received in the recessed portion of the edges of the second member and vice versa. Each edge, such as edge A of the cube, as shown in FIG. 2, therefore includes one portion 71 identifying one of the edges of the first cube member and another portion 81 identifying one edge of the second cube member. The particular edge combination which extends along wall 66 of the testing machine, and the direction in which it extends across the wall (it can extend in two directions along the wall 66) identifies which of the 72 possible arrangements appears on a cube 10 which has been placed on the testing machine. It may be noted that of the 72 different pattern orientations or arrangements, only 36 can be identified by the notches, since some of the cube sides do not have notches. Thus, only 36 different cards can be employed to identify 36 different cube arrangements on the testing machine.

As shown in FIG. 4, the testing machine includes a frame 90 that forms the recesses 16 and 18 that receives a card and cube. Comparing apparatus 94 is provided which compares notches along the edge 12E of a card in the card-receiving region 16, with the notches in a cube edge which lies along the wall 66 of the cube-receiving recess. The comparing apparatus 94 includes an axle member 96 with opposite end portions 98, 100 fixed to the machine frame 90. Ten elements 101–110 are pivotally mounted on the axle member, each element having one end portion for engaging the edge 12E of a card and an opposite end portion for engaging the edge of a cube which lies against wall 66. The axle member 96 is constructed of a resilient material such as a spring steel, so that its center portion, on which the matching elements 101–110 are mounted, can be deflected down. In its usual upward position, the axle member 96 closes a switch 112 that allows energization of the lamp 20 to indicate that a correct match between the card and cube has been made. A downward deflection of axle member 96 causes it to close another switch 114 that allows energization of the buzzer 22 to indicate that a match has not been achieved.

As shown in FIG. 5, each element is coupled by a spring 116 to the axle member 96 to bias the element toward a rotational position wherein the end G which can engage a cube edge is up while the opposite end H which can engage a card is down. When a card 12 is inserted into the testing machine, its edge 12E which contains notches lies above the ends H of the pivotal elements. When a cube 10 is placed on the testing machine, the edge A thereof is adjacent to the pivotal elements and may depress the ends G thereof. As shown in FIG. 5, the edge A has notches 106N, 107N, 109N and 110N which can receive the ends G of elements 106, 107, 109 and 110 so that the ends G of these elements are not pressed down. However, area 108P, which is not notched, serves as a projection that presses down the end G of element 108. If the card 12 were not notched at the area 108C, then the card would hold down the end H of element 108 while the cube pushed down the end G of that element. This would cause the element 108 to push down on the axle member 96 to deflect it downwardly, so that it closed the switch 114 that operated the buzzer. However, the notch 108C of the card allows the end H of element 108 to move upward so that the element does not press down the axle member 96.

The axle member 96 is normally in an upward position wherein it closes switch 112 that can complete a circuit to the light to indicate a correct match. Any cube edge will contain at least one projection such as the projection at area 108P that presses down the end G of one of the elements. If there is a correct match, then the card 12 will have a notch, such as notch 108C, opposite each projection on the cube, to receive the end H of the element which has been rotated by the cube. If the match is not correct, then the card will not have a notch opposite every cube projection, and at least one of the elements 101–110 will be held down by both the cube and the card. That element will push down the axle member 96 and cause the buzzer to sound. Of course, there may be more than one element pushed down by both a cube projection and a card projection, but one element is sufficient to sound the buzzer. If none of the 10 elements 101–110 is held down at both ends, then the lamp should be lighted. In order to prevent the lamp from being lighted until the cube has been placed on the testing machine, a pressure switch 118 is included that is closed only when the cube has been placed in the recess 66.

As shown in FIG. 6, the switch 118 which senses the presence of the cube 10 can complete a circuit through a current source 120, the switch 112 and the lamp 20. This occurs only when all matching elements are either in the position of element 106 wherein its end G is received in a cube recess, or in the position of element 108 wherein the end G has been pressed down, but the other end H is received in a recess of the card, so that axle member 96 remains in its upward position. As shown in FIG. 7, an incorrect match causes the end G of one element to be pushed down by the cube while the other end H cannot rise into a card recess, so that axle member 96 is moved down. This causes switch 114 to close, allowing current to flow through the current source 120 and through the buzzer 22. The current source 120 can be an ordinary flashlight battery.

The game apparatus can be used as a spatial relationship test, or can be used by children as a toy wherein they seek to match three-dimensional arrangements of shapes to those appearing on a card. Even without the cards and teaching machine, the cube 10 provides an interesting toy which can be operated in a novel manner to change the patterns appearing therein. The number of solid objects within the cube can be varied, as can their shape, color, and size to adjust the complexity of the matching process to suit various levels of development of spatial relationship ability. Instead of utilizing a cube shape, a tetrahedral-shaped device can be utilized wherein each half has two sides that can be pulled out, rotated and allowed to move together again. Also, a device can be used with more than the six sides of a cube. When used with a teaching machine, a cube or other object with patterns thereon can be utilized which is not changeable, but wherein only six different patterns, each rotatable to four different positions is employed. Also, instead of utilizing notches, other indicia such as conductive and nonconductive spots arranged along the cube edges can be utilized.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Game apparatus comprising:
   a plurality of members connectable together in a plurality of different positions, said members forming a three-dimensional figure having a visually exposed interior region;
   a plurality of three-dimensional objects connected to said plurality of members for forming patterns when said interior is viewed;
   means attached to said members for orienting said three-dimensional figure and for allowing comparison to be made with a pattern formed on a substantially flat surface; and
   means positionable adjacent said three-dimensional figure for carrying a pattern, said pattern-carrying means having a substantially flat surface upon which said pattern is formed;
   whereby the object of said game is to correctly orient the patterns formed by said three-dimensional figure to correspond with said pattern of said pattern-carrying means.

2. Game apparatus comprising:
   first and second members formed to fit together in a plurality of relative rotational positions to form a solid-type geometric figure in each of said rotational positions, each of said members having transparent walls;

a plurality of objects mounted on the inner faces of the walls of said members, to form different patterns, as seen by an observer looking through one of said transparent walls, at different relative rotational positions of said members;

each of said members having a plurality of different indicia at a plurality of different locations thereon; and means for receiving said geometric figure formed by said members, including means responsive to indicia on said first and second members for providing an indication dependent upon both the orientation of said members with respect to each other and to said means for receiving said figure.

3. Game apparatus including:

first and second members, each including three mutually adjacent sides of a cube, for fitting together in three different relative rotational positions;

means for releasably holding said members together at each of said three relative rotational positions;

each of said sides of each member having indicia along at least part of one edge, for indicating the orientation of that member; and testing apparatus including a frame for receiving said cube and means responsive to some of said indicia on each of said members for indicating whether said members have a predetermined orientation with respect to each other and with respect to said frame.

4. Apparatus for automatically indicating whether a portion of an object coded with a plurality of projections and recesses has been received at a predetermined region comprising:

a frame having a first region for receiving said object, and a second region with means therein establishing a code defined by a plurality of projections and recesses;

axle means mounted on said frame;

a plurality of elements pivotally mounted on said axle means and extending between predetermined positions at said first and second regions for receiving the forces from the projections at said regions;

means responsive to movement of said axle means, for indicating whether the code on said object corresponds to the code at said second region;

an object with a plurality of edges having notches that form said recesses, the areas between said notches forming said projections, said object constructed to have a distinctively different appearance when viewed from different directions; and a plurality of cards for reception in said second region each having notches at positions corresponding to the notches at a predetermined edge of said object to cause said means for indicating to indicate correspondence of codes on said object and at said second region, and each card having a picture thereon pictorially showing the appearance of said object when it is placed on said first region of said frame in a manner so that said predetermined edge extends along said elements.

5. Game apparatus as claimed in claim 1 including:

means for receiving said three-dimensional figure and said pattern-carrying means and for indicating congruency therebetween.

6. Game apparatus comprising:

a cube including first and second members, each member forming half of said cube, and each member having substantially transparent sides, objects on said sides that form patterns, and different indicia at different positions on the member, said cube including means for holding said members together in a plurality of relative rotational positions to form a plurality of pattern combinations;

a plurality of card means, each having indicia corresponding to the indicia at a position on each of said members; and receiving apparatus including a first region for receiving said cube, a second region for receiving a card means, and means for indicating whether the indicia on each of said members at predetermined positions relative to said receiving apparatus correspond to the indicia on a card means received at said second region.

7. The game apparatus described in claim 6 wherein:

said indicia comprises notches formed along at least some of the edges of said members, each of said edges having notches along only part of the length of the edge and having a recess along another part of the edge for receiving a notched portion on the edge of the other member.

8. The game apparatus described in claim 6 wherein:

each of said card means has a visual pattern thereon depicting the pattern seen through one of said cube faces when said members are in a predetermined relative orientation.

* * * * *